United States Patent [19]
Birnbaum

[11] 3,829,696
[45] Aug. 13, 1974

[54] ATMOSPHERIC $NO_2$ MONITOR
[75] Inventor: Milton Birnbaum, Palos Verdes Peninsula, Calif.
[73] Assignee: The Aerospace Corporation, Los Angeles, Calif.
[22] Filed: Apr. 26, 1973
[21] Appl. No.: 354,471

[52] U.S. Cl................. 250/365, 250/373, 250/432, 250/461
[51] Int. Cl............................................. G01t 1/20
[58] Field of Search .......... 250/304, 301, 373, 363, 250/273, 432, 365, 461

[56] References Cited
UNITED STATES PATENTS
| | | | |
|---|---|---|---|
| 2,288,942 | 7/1942 | Doan | 250/301 |
| 2,974,227 | 3/1961 | Fisher et al. | 250/273 |
| 3,510,648 | 5/1970 | Leger | 250/301 |
| 3,649,833 | 3/1972 | Leaf | 250/432 |
| 3,761,715 | 9/1973 | Mezzses | 250/363 |
| 3,763,374 | 10/1973 | Tiffany et al. | 250/432 |

Primary Examiner—Harold A. Dixon
Attorney, Agent, or Firm—Francis R. Reilly

[57] ABSTRACT

Method and apparatus for the continuous, real-time measurement of the nitrogen dioxide ($NO_2$) content of a gaseous atmosphere. A flowing or non-confined atmospheric sample is subjected to energizing radiation in the broad $NO_2$ absorption spectrum, preferably between about 400 and 600 nm., with sufficient energy to excite the $NO_2$ to its fluorescent state. A detector measures the fluorescence in the red band (about 620 nm. to 800 nm.) with lower wavelength radiation, including the exciting radiation, being filtered from the detector. The detector output count provides a direct indication of the $NO_2$ constituent with an accuracy of 1 part per hundred million or better.

3 Claims, 1 Drawing Figure

ATMOSPHERIC NO₂ MONITOR

BACKGROUND OF THE INVENTION

1. Field of the Invention

This invention relates to the measurement of the $NO_2$ content of gases by photometric analysis of $NO_2$ fluorescence in the red band resulting from its excitation by an intense radiation source.

2. Description of the Prior Art

Heretofore the more widely recognized and practiced process of $NO_2$ analysis was by chemical means such as the Saltzman reagent test described in Analytical Chemistry, 26, 1949(1954) and 32, 135 (1960). This and other chemical tests are not reliable at very low concentrations of $NO_2$ in the range including a few parts per hundred million (pphm) and lower. Chemical tests further involve a time lapse between sampling and the availability of results and thus cannot provide real-time analysis.

More recently developed $NO_2$ detection processes employ photometric analysis. These processes generally include the transmission of a beam of radiation through a sample of the gas with the radiation having a wavelength within the $NO_2$ absorption spectrum. By subtracting the strength of the radiation emerging from the sample from the strength of the illuminating radiation a measure of the radiation that has been absorbed by the $NO_2$ is obtained. Theoretically, this measure is directly proportional to the $NO_2$ concentrations but only after compensation has been provided for scattering and absorption of the illuminating radiation by other gas constituents or contaminents.

The most difficult aspect of directly measuring the $NO_2$ absorption of radiation stems from the fact that at low concentrations of $NO_2$ only a microportion of illuminating radiation is absorbed. Only under theoretical or ideal conditions, and only with the use of ultra-sensitive detectors, can the full strength of the illuminating signal be distinguishable from its reduced strength after its absorption by $NO_2$. For this reason the $NO_2$ absorption of radiation is not practical or reliable except for measurement of high $NO_2$ concentrations.

SUMMARY OF THE INVENTION

The principal feature of the present invention resides in the analysis of a gaseous atmosphere by illuminating the gas with radiation at one wavelength to effect molecular fluorescence at a second distinct wavelength of that constituent whose presence is to be determined. By monitoring only such distinct wave length, the concentration of the gaseous constituent of interest is directly determined. Of course, in applying this broadest feature of the invention, the wavelength of the illuminating radiation should be selected to be such as to cause only that gaseous constituent, whose presence is sought, to produce radiation in the second distinct wavelength.

The atmospheric $NO_2$ detecting method and apparatus of the present invention involves the excitation of the $NO_2$ by radiation in the wavelength range up to 575 or 600 nm. and measuring $NO_2$ fluorescent emissions in the red bandwidth, i.e., 620 to 800 nm. Since the radiation-fluorescence reaction is substantially instantaneous the atmosphere can be continuously monitored by observation of a steady sample flow from such atmosphere through the apparatus of the invention. Another principal advantage of this invention is that other normal constituents of air, entrained water vapor, and gaseous pollutants do not produce radiation within $NO_2$ fluorescence bandwidth being detected. Fluctuations in the concentrations of these other air components therefore do not modify or affect the accuracy of $NO_2$ concentration reading.

The present invention also provides a $NO_2$ monitor that includes a meter nulling and calibration arrangement or that otherwise may be calibrated by comparison with other standards as done with many other forms of monitors. The meter nulling is accomplished by first flowing the atmospheric sample through a filter branch within which all $NO_2$ is removed. After such removal the sample is illuminated and the read-out gauge or meter is nulled. Then the filter branch is by-passed with the sample flowing directly to the test chamber for analysis. Gauge readings from the illuminated unfiltered sample are then attributable only to the $NO_2$ content.

The apparatus is calibrated by mixing pure $NO_2$ with another gas such as $N_2$ in such proportions to produce a known concentration of $NO_2$, as for example, 25 parts per hundred million (pphm). The mixture is flowed through the apparatus and illuminated. The meter read out is then used as a baseline for determination of $NO_2$ concentrations in other gases.

The present invention may also be employed to measure the NO content of the atmosphere. This feature is accomplished by first measuring the $NO_2$ concentration, then converting the NO content to $NO_2$ by oxidation, and again measuring the $NO_2$ content. The increase of the second measurement over the first is indicative of the NO content of the sample. While this technique has before been employed with other apparatus it is nonetheless a valuable adjunct to the present invention.

DESCRIPTION OF THE PREFERRED EMBODIMENT OF THE INVENTION

Figure 1:
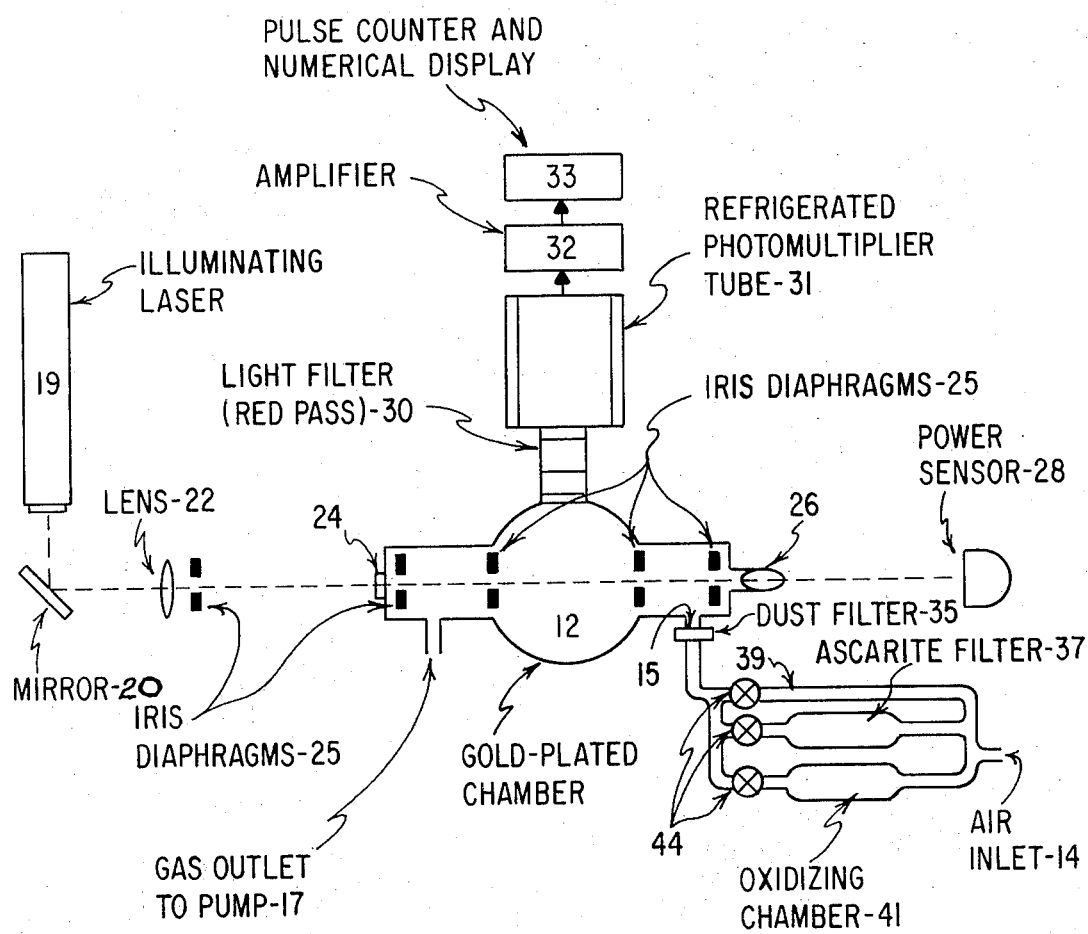
FIG. 1 of the drawing is a schematic representation of the apparatus of the present invention.

The drawing shows the apparatus for monitoring the $NO_2$ content of a gaseous atmosphere by photometric analysis. The apparatus includes a sealed chamber 12 internally plated with an opaque material such as gold to render chamber 12 light tight. A sample of the atmosphere or air being monitored is drawn in through air inlet 14 and via ducting enters one end of chamber 12 through port 15. The air flows through and fills chamber 12 and is exhausted therefrom under the action of a vacuum pump (not shown) connected to exhaust port 17 located at the end of the chamber 12 remote from the entry port 15. The interior of chamber 12 is illuminated by a gas or solid state laser 19 whose beam is reflected 90 degrees by mirror 20 through the focusing lens 22 into chamber 12 through light aperture 24. The light beam is collimated within chamber 12 by a series of iris diaphragms 25 and exits through window 26 where it is intercepted by power sensor 28.

$NO_2$, the principal gas of concern in the present form of the invention, has a broad absorption spectrum including the band between 300 and 600 nm. $NO_2$ further has a fluorescence spectrum starting at the excitation wavelength and continuing to the infrared (620 to 800 nm.) Thus illuminating laser 19 must emit within the $NO_2$ absorption spectrum and may be a continuous wave argon ion laser emitting at 488.0 nm or a helium-cadmium laser emitting at 441.6 nm.

Upon excitation by the laser 19 with a power that may be in the lower milliwatt regime, the $NO_2$ content of the gas in chamber 12 fluoresces. This emission is admitted through red pass filter 30 to the photomultiplier tube 31 which is refrigerated for improved sensitivity and reduction of dark count. An effective form of filter 30 is a cobalt sulphate ($CoSO_4$) solution followed by a CS2–63 Corning glass filter, the latter blocking weak violet light that may pass the $CoSO_4$ filter. In selecting suitable filter materials most commercially available types such as colored glass and dielectric layered filters are not considered desirable since they fluoresce in the red region upon irradiation with blue or green laser light. $CoSO_4$ does not so react to any detectable extent. The output of the photomultiplier 31 is amplified by amplifier 32 and fed into pulse counter 33 with an input level discriminator and numercial display. Ten parts per hundred million (10 pphm) of $NO_2$ in air produce approximately 14,000 counts in a 50 second interval with excitation by a 100mW. argon ion laser operating at 488.0 nm. This count is in close agreement with the theoretical computed count using the fluorescence yield corrected for filter absorption and solid angle considerations. Sensitivity of the apparatus can be increased by the use of higher powered lasers.

Still referring to FIG. 1, immediately upstream from entry port 15 is a dust filter 35 which may be a glass frit filter with a nominal pore size of 5 microns. While not an absolute necessary part of the apparatus, filter 35 serves the purpose of eliminating the extraneous signals that might be caused by dust.

One method of nulling the pulse counter so as to compensate or subtract out fluorescence other than that of $NO_2$ is to pass the inflowing air through a column 37 of Ascarite, a mixture of sodium hydroxide and asbestos, prior to the passage of the air through illuminated chamber 12. The Ascarite filter 37 effectively absorbs all $NO_2$ in the air. Any signal received by pulse counter 33 from laser illuminated air in chamber 12 after filtering by Ascarite is considered noise and thus should be nulled.

Normally air is flowed to chamber 12 via ducting 39. In order to expand the capability of the present apparatus to measure the nitrogen oxide (NO) content of air an alternate path is provided for inlet air. In this alternate path an oxidizing chamber 41 is included. The action of the oxidizing agent in chamber 41 converts an NO in the air to $NO_2$. Using this arrangement the $NO_2$ content of the air is first measured by allowing the air to flow directly to chamber 12 through ducting 39. The air is thereafter routed through oxidizing chamber 41 and the increase in the $NO_2$ content of the air is attributable to $NO_2$ that has been added by the oxidation of NO.

The routing of the inlet air selectively through ducting 39, Ascarite filter 37, or oxidizing chamber 41 is controlled by opening the one of valves 44 downstream of the desired path with the other two of such valves 44 being closed.

Determination of the $NO_2$ content of air is performed by flowing the air sample through chamber 12 at a rate of approximately 15 liters per minute. This flow can be varied as required by chamber size and precise control of flow rate is not critical since the apparatus is insensitive to this parameter.

It has been verified that the signal output of the present invention is attributable exclusively to the $NO_2$ content of air. This was demonstrated by flowing other known contaminents of air, such as NO and $SO_2$, through chamber 12 under illumination by laser 19. These other contaminents did not create any detectable signals. Also, varying the amount of water vapor up to saturation does not alter the signal from a constant concentration of $NO_2$. In addition to monitoring the $NO_2$ content of ambient air, the apparatus has equal utility in working in the analysis of automobile exhaust and factory stack emissions.

Experimentation has shown that a second form of chamber 13 design may consist of a double walled, hollow, cylindrical cell. The space between the walls is filled with a $CoSO_4$ solution. This has resulted in a reduction in the spurious or background signal which must be nulled out.

The present monitor by virtue of the substantial instantaneous fluorescence of $NO_2$ under laser illumination provides a real time measurement of such $NO_2$ and may be operated continuously. By measuring the fluorescence in a wave band or wavelength that excludes the wavelength of the energizing illuminating source the difficulty of discrimination between these wavelengths is eliminated and the output fluorescence is a direct function of the $NO_2$ content of the air.

The invention may be extended to provide for remote detection of $NO_2$ in air. Fundamentally the free air may be examined by illuminating the gas under observation and measuring the fluorescent emission of a finite volume of the gas. The calibration of such arrangement will be more complex however because of loss of illuminating power by atmospheric absorption, scattering and similar phenomena. Likewise the return fluorescence will be diminished due to quenching and atmospheric interaction or "seeing" conditions.

While I have explained my invention with respect to the presently preferred embodiment thereof it can be modified within the spirit of the following claims.

I claim:

1. Apparatus for measuring the $NO_2$ content of a gaseous atmosphere comprising:
   a. means for illuminating and energizing a sample of the atmosphere within the absorption spectrum of $NO_2$, said means having a power range to effect fluorescense of the $NO_2$;
   b. means for measuring the fluorescent emission from the $NO_2$ upon energization thereof;
   c. means for shielding the measuring means from light in a waveband including the wavelength of the illuminating means; and,
   d. selectively employed means oxidizing the sample of the atmosphere prior to subjecting the sample to illumination whereby to convert NO in the sample to $NO_2$.

2. Apparatus for measuring the $NO_2$ content of a gaseous atmosphere comprising:
   a. means for illuminating and energizing a sample of the atmosphere within the absorption spectrum of $NO_2$, said means having a power range to effect fluorescense of the $NO_2$;
   b. means for measuring the fluorescent emmission from the $NO_2$ upon energization thereof;

c. means for shielding the measuring means from light in a waveband including the wavelength of the illuminating means;
d. a $NO_2$ absorbing filter; and,
e. means for selectively passing a sample of the atmosphere through the $NO_2$ filter prior to the energization thereof by the illuminating means to provide a null indicator for the measuring means.

3. Apparatus for measuring the $NO_2$ content of a gaseous atmosphere comprising:
   a. a walled chamber having an interior sealed off from external ambient light;
   b. means providing a flow of the gaseous atmosphere through the interior of the chamber;
   c. a laser providing a monochromatic output beam within a range of the spectrum corresponding to the range of maximum absorbtivity of light by $NO_2$;
   d. an entrance aperture at one side of the chamber and an exit aperture at an opposite side of the chamber, said laser output beam passing through the chamber via the entrance and exit apertures;
   e. light collimating means for confining the laser output beam within the chamber interior whereby only the gas within the chamber is subjected to illumination by the laser beam;
   f. means measuring fluorescent emissions from the $NO_2$ in the chamber upon excitation by the laser beam travelling through the chamber;
   g. a red band-pass filter shielding the measuring means from light of shorter wavelength including the laser beam, said filter being substantially non-fluorescent under irradiation by light of the wavelength of the laser.

* * * * *